United States Patent
Nagata et al.

(10) Patent No.: US 11,953,882 B2
(45) Date of Patent: Apr. 9, 2024

(54) PRODUCTION SYSTEM, CONTROL METHOD, AND INFORMATION STORAGE MEDIUM

(71) Applicant: Kabushiki Kaisha Yaskawa Denki, Kitakyushu (JP)

(72) Inventors: Takeshi Nagata, Kitakyushu (JP); Takahiko Suzuki, Kitakyushu (JP); Shinichiro Obata, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 525 days.

(21) Appl. No.: 17/199,404

(22) Filed: Mar. 11, 2021

(65) Prior Publication Data
US 2021/0286340 A1   Sep. 16, 2021

(30) Foreign Application Priority Data
Mar. 13, 2020   (JP) ................................. 2020-044722

(51) Int. Cl.
G05B 19/4155   (2006.01)
G05B 19/18   (2006.01)

(52) U.S. Cl.
CPC ....... *G05B 19/4155* (2013.01); *G05B 19/182* (2013.01); *G05B 2219/49312* (2013.01)

(58) Field of Classification Search
None
See application file for complete search history.

(56) References Cited

U.S. PATENT DOCUMENTS

| | | | | |
|---|---|---|---|---|
| 5,446,648 A * | 8/1995 | Abramovitch | ......... | G05B 17/02 700/53 |
| 2016/0238659 A1 * | 8/2016 | Shiromoto | .............. | H04L 69/40 |
| 2017/0068236 A1 * | 3/2017 | Iname | .................. | G05B 19/054 |
| 2017/0308052 A1 | 10/2017 | Kajiyama | | |
| 2019/0204803 A1 * | 7/2019 | Ogikubo | ................ | G05B 19/05 |
| 2021/0067483 A1 * | 3/2021 | Kurokawa | ............ | H04L 61/103 |

FOREIGN PATENT DOCUMENTS

| EP | 3101497 A1 | 12/2016 |
|---|---|---|
| JP | 2018112881 A | 7/2018 |
| JP | 2019159631 A | 9/2019 |
| WO | 2015068210 A1 | 5/2015 |

OTHER PUBLICATIONS

Office Action dated May 18, 2021, for corresponding JP Patent Application No. 2020-044722 with partial English translation pp. 1-5.
Partial Search Report dated Jul. 14, 2021, for corresponding EP Patent Application No. 21161789.9 pp. 1-16.
Search Report dated Oct. 15, 2021, for corresponding EP Patent Application No. 21161789.9 pp. 1-14.
Office Action dated Dec. 20, 2023, for corresponding CN Patent Application No. 202110278278.5 with translation, pp. 1-13.

* cited by examiner

*Primary Examiner* — Mohammad Ali
*Assistant Examiner* — Joshua T Sanders
(74) *Attorney, Agent, or Firm* — HEA LAW PLLC (57) ABSTRACT

A production system, comprising: a first industrial machine configured to control a second industrial machine based on each of a plurality of variables; and circuitry configured to input, to the first industrial machine, a control command relating to an operation of at least one of the first industrial machine or the second industrial machine, wherein the first industrial machine rewrites, based on the control command, at least one variable defined as a rewritable variable among the plurality of variables.

15 Claims, 7 Drawing Sheets

| VARIABLE | COMMENT |
|---|---|
| VARIABLE A | WORKPIECE POSITION |
| VARIABLE B | ROBOT ARM SPEED |
| VARIABLE C | GRIP SENSOR SIGNAL |
| ⋮ | ⋮ |

| VARIABLE | VALUE |
|---|---|
| VARIABLE A | 15 |
| VARIABLE B | 121 |
| VARIABLE C | 1 |
| ⋮ | ⋮ |

PRODUCTION SYSTEM, CONTROL METHOD, AND INFORMATION STORAGE MEDIUM

CROSS-REFERENCE TO RELATED APPLICATION

The present disclosure contains subject matter related to that disclosed in Japanese Priority Patent Application JP 2020-044722 filed in the Japan Patent Office on Mar. 13, 2020, the entire contents of which are hereby incorporated by reference.

BACKGROUND OF THE INVENTION

1. Field of the Invention

The embodiments disclosed herein relate to a production system, a control method, and an information storage medium.

2. Description of the Related Art

In WO 2015/068210 A1, there is described a system configured to detect an operation of each of a plurality of industrial machines and upload trace data to a cloud server. In this system, the trace data is analyzed by an analyst. A user of the industrial machine is notified of an analysis result obtained by the analyst. The user of the industrial machine performs, for example, adjustment of parameters of the industrial machine based on the analysis result.

SUMMARY OF THE INVENTION

According to one aspect of the present disclosure, there is provided a production system including: a first industrial machine configured to control a second industrial machine based on each of a plurality of variables; and circuitry configured to input, to the first industrial machine, a control command relating to an operation of at least one of the first industrial machine or the second industrial machine, wherein the first industrial machine rewrites, based on the control command, at least one variable defined as a rewritable variable among the plurality of variables.

DESCRIPTION OF THE EMBODIMENTS

1. Overall Configuration of Production System

In a technology for collecting data relating to an operation of an industrial machine, an analysis result is reflected in the industrial machine after an analysis is performed by an analyst, and hence it has required much time for the analysis result to be reflected. In addition, the analysis performed by the analyst may cause an error, and there has been a case in which the analysis is not performed accurately. As a result of extensive research and development for quickly and accurately executing a control command directed to the industrial machine, the inventors have conceived of a novel and original production system and the like. A detailed description is now given of the production system and the like according to an embodiment of the present disclosure.

Figure 1:
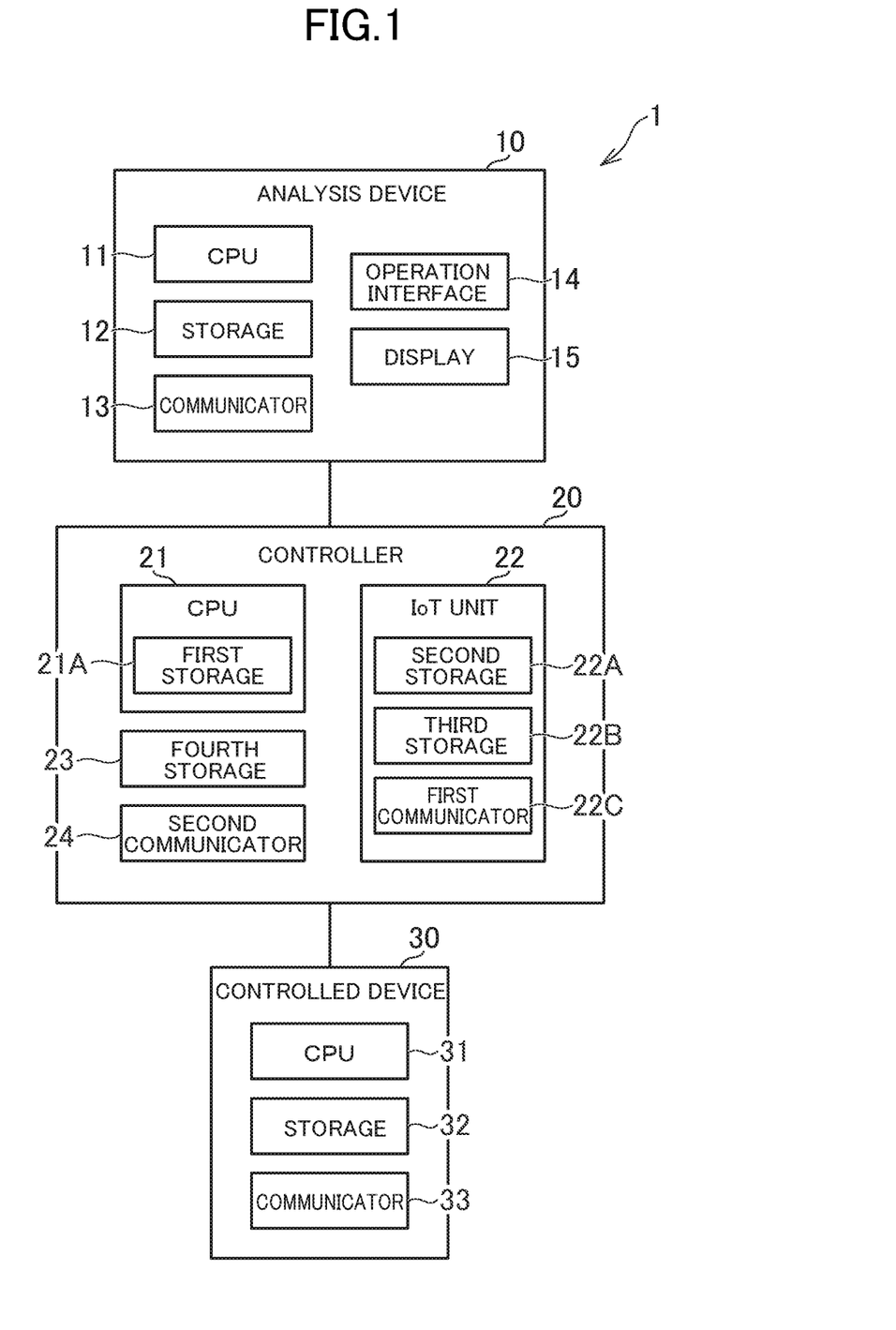
FIG. 1 is a diagram for illustrating an example of an overall configuration of a production system according to an embodiment of the present disclosure.

FIG. 1 is a diagram for illustrating an example of an overall configuration of the production system. As illustrated in FIG. 1, a production system 1 includes an analysis device 10, a controller 20, and a controlled device 30. In this embodiment, the analysis device 10 and the controller 20 are connected to each other through a general network, for example, an Ethernet (trademark). The controller 20 and the controlled device 30 are connected to each other through a network for industrial machines. The network for connecting machines to each other is not limited to the example of this embodiment, and can be connected to each other through any network.

The analysis device 10 is an example of an external device. Accordingly, the term "analysis device 10" as used in this embodiment can be read as "external device." The external device is a device different from an industrial machine described later. The external device is communicatively connected to the industrial machine through the network. For example, the external device is configured to collect data relating to the operation of the industrial machine. In addition, for example, the external device is configured to analyze the operation of the industrial machine. In this embodiment, the external device is configured to transmit a control command corresponding to the analysis result to the industrial machine.

For example, the analysis device 10 is a personal computer, a server computer, a cellular phone (including a smartphone), or a mobile terminal (including a tablet terminal). The analysis device 10 may be a kind of the industrial machines. The analysis device 10 includes a CPU 11, a storage 12, a communicator 13, an operation interface 14, and a display 15.

The CPU 11 includes at least one processor. The storage 12 includes a RAM or a hard disk drive, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The controller 20 is an example of the industrial machine (first industrial machine). Accordingly, the term "controller 20" as used in this embodiment can be read as "industrial machine (first industrial machine)." The industrial machine is a collective term for machines configured to assist or substitute human work and peripheral machines thereof. For example, in addition to the controller 20, the controlled device 30 also corresponds to the industrial machine. For example, a programmable logic controller (PLC), a robot controller, an industrial robot, a motor controller, a servo amplifier, an inverter, a converter, a machine tool, a conveyance device, or a semiconductor manufacturing apparatus corresponds to the industrial machine. The controller 20 is configured to control at least one controlled device 30. The production system 1 may be referred to as "cell," which is a unit smaller than a line. In this case, the controller 20 may be referred to as "cell controller."

The controller 20 includes a CPU 21, an Internet-of-Things (IoT) unit 22, a fourth storage 23, and a second communicator 24. The physical configuration of each of the CPU 21, the fourth storage 23, and the second communicator 24 may be the same as that of the CPU 11, the storage 12, and the communicator 13, respectively. In this embodiment, the CPU 21 includes a first storage 21A. The first storage 21A includes at least one of a volatile memory or a nonvolatile memory. For example, the first storage 21A may include a memory called "cache memory." The first storage 21A stores a variable described later.

The CPU 21 is an example of a first control circuit. Accordingly, the CPU 21 as used in this embodiment can be read as "first control circuit." The first control circuit is configured to control another industrial machine described later based on each of a plurality of variables described later. The first control circuit is not limited to a general-purpose processor, and may be any circuit. For example, the first control circuit may be a circuit called "FPGA" or "ASIC." The first control circuit is a kind of circuitry.

The IoT unit 22 is an example of a second control circuit. Accordingly, the IoT unit 22 as used in this embodiment can be read as "second control circuit." The second control circuit is a circuit configured to receive a control command. The second control circuit is not limited to the circuit used for IoT, and may be any circuit. For example, the second control circuit may be a circuit called "FPGA" or "ASIC." For example, the second control circuit may be a general-purpose processor. The second control circuit is a kind of circuitry.

The IoT unit 22 is configured to transmit data to another computer through the network. For example, the IoT unit 22 includes a second storage 22A, a third storage 22B, and a first communicator 22C. The second storage 22A and the third storage 22B may each be the same as the storage 12. The first communicator 22C may be the same as the communicator 13. For example, the first communicator 22C is mainly used for communication to/from the analysis device 10, and the second communicator 24 is mainly used for controlling the controlled device 30. The IoT unit 22 may include another configuration, for example, a CPU. When the CPU 21 is provided with a data collection function, the IoT unit 22 may be omitted.

The controlled device 30 is an example of another industrial machine (second industrial machine). Accordingly, the controller 20 as used in this embodiment can be read as "another industrial machine (second industrial machine)." The term "industrial machine" has such a meaning as described above. The another industrial machine may be any kind of industrial machine described above. In this embodiment, another industrial machine is controlled by the controller 20. It suffices that another industrial machine is an industrial machine different from the controller 20.

The controlled device 30 includes a CPU 31, a storage 32, and a communicator 33. The physical configuration of each of the CPU 31, the storage 32, and the communicator 33 may be the same as that of each of the CPU 11, the storage 12, and the communicator 13, respectively. The controlled device 30 may also include other physical components. For example, the controlled device 30 may include a circuit referred to as "FPGA" or "ASIC." Further, for example, a machine to be controlled, such as a motor or the like, a sensor for detecting an operation of a motor, a camera for photographing a state of a workpiece to be processed, an input/output device, or another industrial machine may be connected to the controlled device 30. The number of controlled devices 30 to be controlled by the controller 20 may be any number. For example, the controller 20 may control only one device, or may control two or more devices.

The programs and data described as being stored in each of the analysis device 10, the controller 20, and the controlled device 30 may be supplied through the network. Moreover, the hardware configuration of each device is not limited to the above-mentioned example, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

2. Outline of Production System

In this embodiment, the controller 20 is configured to control the controlled device 30 based on each of the plurality of variables. The variable is referred to by a control program for controlling the controlled device 30. The control program may also rewrite the variable. For example, the variable indicates a result of unfinished calculation or a physical quantity detected by a sensor (for example, a torque value detected by a torque sensor or a rotation speed of a motor detected by a motor encoder). The variable may be a value relating to an operation of the controlled device 30, and may be a value of, for example, a position or a moving speed of a robot arm, a speed of the motor, or a waiting time for waiting for the operation.

For example, when the controlled device 30 executes a plurality of processes in a predetermined order, an execution order of the processes is described in the control program. The controller 20 sends an instruction to the controlled device 30 based on the control program. The variable may be used as an execution condition of the process. For example, the controlled device 30 stores a variable for starting the process, a variable for suspending the process, or a variable for ending the process. The variable may be referred to as "input/output variable."

The "process" is a task or an operation to be performed by the controlled device 30. The process may be composed of only one task, or may be composed of a combination of a plurality of tasks. The process may have any content in accordance with the use of the controlled device 30. For example, the process is recognition of a workpiece, gripping of a workpiece, opening/closing of a door, setting of a workpiece, or machining using a machine tool. The controlled device 30 performs at least one process. The number of processes to be performed by the controlled device 30 may be any number. The controlled device 30 may perform only one process, or may perform a plurality of processes. The controlled device 30 performs the process based on the instruction received from the controller 20 and a device program stored in the controlled device 30 itself.

The device program is a program defining an operation of the controlled device 30. In the device program, each procedure of each process is defined. The device program can be created in any language in accordance with the controlled device 30, and is created in, for example, a ladder language or a robot language. In this embodiment, a device program is prepared for each process. Accordingly, when a certain controlled device 30 is to perform "n" processes ("n" is a natural number), the controlled device 30 stores at least "n" device programs.

In this embodiment, description is given of a case in which a user of the analysis device 10, a user of the controller 20, and a user of the controlled device 30 are different from one another. For example, when the user of the controller 20 defines a variable and creates a control program, the user of the analysis device 10 may not be familiar with contents of the variable and the control program. Accordingly, some variables are preferred not to be rewritten by the control command sent from the analysis device 10.

In view of this, in the production system 1 according to this embodiment, of the plurality of variables, variables that can be rewritten by the control command sent from the analysis device 10 are defined. Such a definition is hereinafter referred to as "variable definition." The variables defined in the variable definition can also be said to be variables disclosed to the user of the analysis device 10. For example, the user of the analysis device 10 can collect the variables defined in the variable definition. The user of the analysis device 10 may collect all the variables defined in the variable definition, or may collect only a part thereof. Variables that can be rewritten by the control command sent from the analysis device 10 are distinguished from variables that cannot be rewritten by the control command sent from the analysis device 10 based on the variable definition. For example, the variable definition is created by the user of the controller 20.

Figure 2:
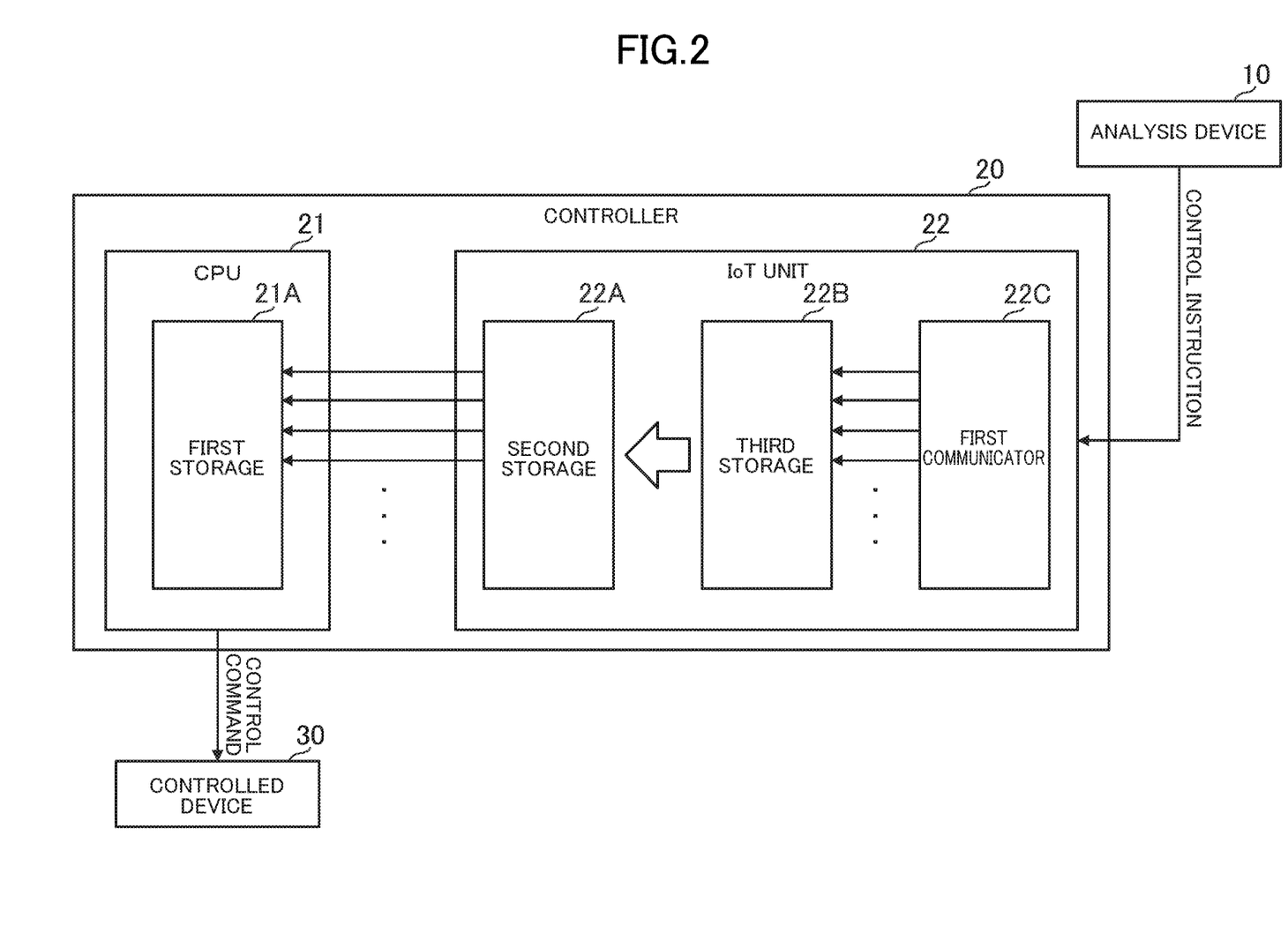
FIG. 2 is a diagram for illustrating a flow of processing for rewriting a value of a variable.

FIG. 2 is a diagram for illustrating a flow of processing for rewriting a value of the variable. As illustrated in FIG. 2, the analysis device 10 is configured to transmit the control command to the controller 20. The control command is a command to be sent to the controller 20 from the analysis device 10, and can include any content. For example, the control command is a command for rewriting at least one of the variables defined in the variable definition. The control command may be a command having a fixed cycle, or may be a command not particularly having a fixed cycle. A command functioning as feedback by the analysis device 10 is an example of the control command. The control command is not limited to the command functioning as feedback. The control command has a data format defined in advance, and its data length may be fixed or variable. The control command includes a name of a variable to be rewritten and its value. For example, the analysis device 10 analyzes the values of the variables collected from the controller 20, and transmits the control command corresponding to its analysis result. The control command is transmitted to the first communicator 22C of the IoT unit 22.

When the first communicator 22C starts to receive the control command, the first communicator 22C writes the name of the received variable and its value to the third storage 22B. The name of the variable may not be written to the third storage 22B, and its value may be written to a register corresponding to the name of the variable. This point is the same when the value of the variable is written to the first storage 21A and the second storage 22A which are described later. When the analysis device 10 finishes transmitting the control command, the analysis device 10 transmits a predetermined completion notification to the controller 20. The first communicator 22C continues receiving the control command until the completion notification is received, and hence the names of the received variables and their values are written to the third storage 22B.

When the first communicator 22C receives the completion notification, the writing of all the variables included in the control command to the third storage 22B is completed. When the writing of the variable to the third storage 22B is completed, the IoT unit 22 writes the variable written in the third storage 22B to the second storage 22A. The third storage 22B serves as a buffer for temporarily holding the value of the variable included in the control command.

In this embodiment, the variables stored in the first storage 21A and the variables stored in the second storage 22A are periodically (regularly) matched with each other. Those variables also include variables other than the variables included in the control command. For example, the first storage 21A also stores a variable that is not defined in the variable definition (variable that is not disclosed to the user of the analysis device 10). This variable can also be said to be a variable for controlling the controlled device 30.

When the variable written in the third storage 22B is written to the second storage 22A before the matching of the variables between the first storage 21A and the second storage 22A is completed (that is, while those variables are being matched with each other), the value of the variable to be included in the control command may not be accurately reflected.

For example, within one cycle period, a plurality of variables are subjected to the matching in a predetermined order. It is assumed that the variable that has already been subjected to the matching in one cycle period is written from the third storage 22B to the second storage 22A before the matching in that cycle period is completed. This variable is no longer subjected to the matching in that cycle period, and hence even when a value is written to the second storage 22A, this value is to be reflected in the first storage 21A in the next cycle period. Meanwhile, the variables that have not been subjected to the matching yet are reflected in the first storage 21A in the current cycle period. In this case, the plurality of variables to be simultaneously reflected are reflected in mutually different cycle periods, and hence accurate reflection cannot be performed.

In this respect, it is highly possible that the matching of the variables between the first storage 21A and the second storage 22A is completed immediately before the end of one cycle period. Accordingly, in this embodiment, the variable is written from the third storage 22B to the second storage 22A immediately before the end of one cycle period. The variables written in the second storage 22A are written to the first storage 21A in the next cycle period. Thus, the variables included in the control command can be simultaneously reflected. The CPU 21 controls the controlled device 30 based on the variables written in the first storage 21A.

As described above, the production system 1 rewrites at least one of the variables defined in the variable definition in accordance with the control command sent to the controller from the analysis device 10, to thereby quickly and accurately execute the control command directed to the controller 20. This configuration is described below in detail.

3. Functions to be Implemented in Production System

Figure 3:
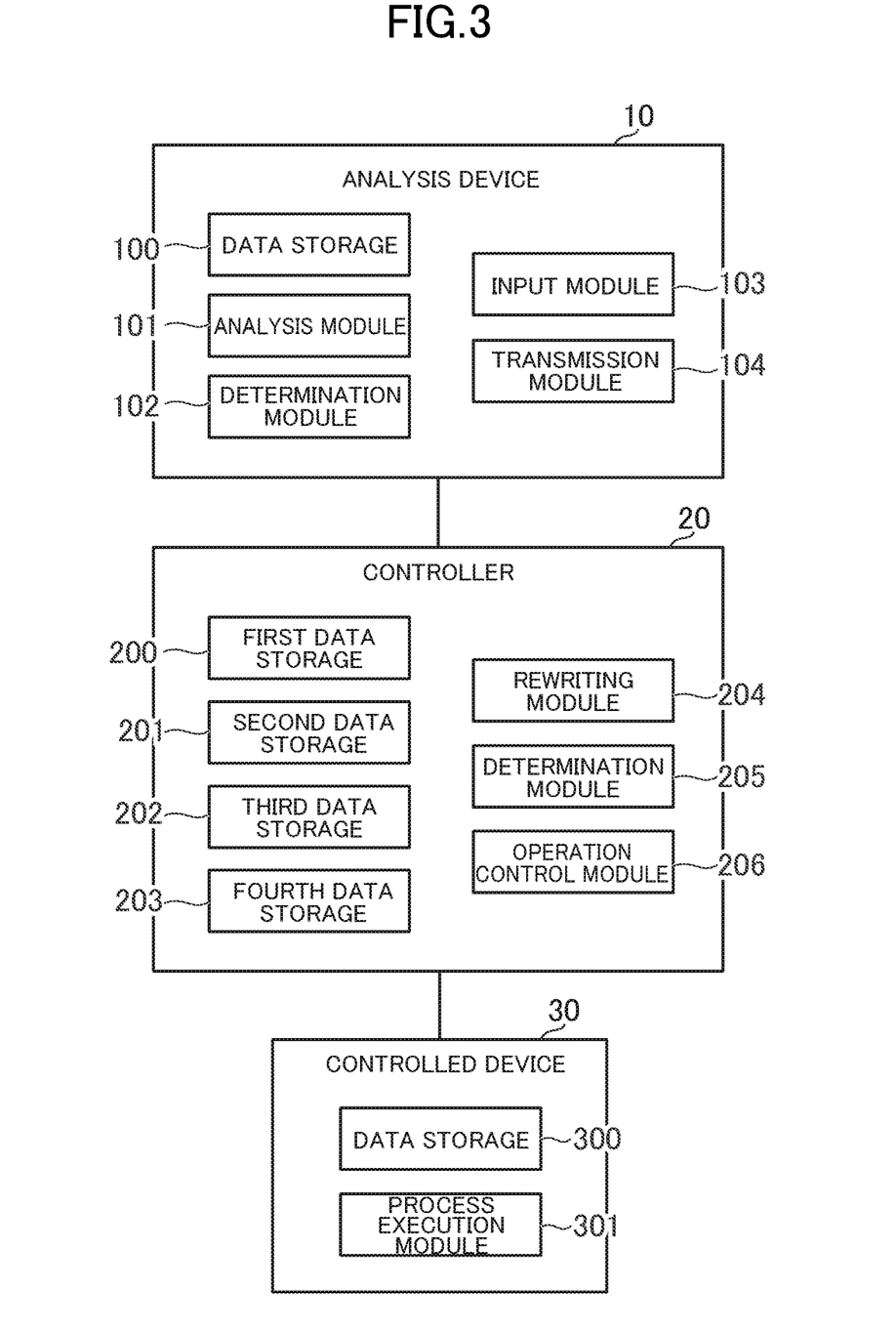
FIG. 3 is a functional block diagram for illustrating functions to be implemented in the production system.

FIG. 3 is a functional block diagram for illustrating functions to be implemented in the production system 1. In this embodiment, functions to be implemented in each of the analysis device 10, the controller 20, and the controlled device 30 are described.

3-1. Functions to be Implemented by Analysis Device

As illustrated in FIG. 3, the analysis device 10 includes a data storage 100, an analysis module 101, a determination module 102, an input module 103, and a transmission module 104.

[Data Storage]

The data storage 100 is mainly implemented by the storage 12. The data storage 100 is configured to store data required for transmitting a control command. For example, the data storage 100 stores the collected data storing the variables collected from the controller 20. The collected data is data storing the values of the variables defined in the variable definition. The collected data may store the value of a variable at a certain time point, or may store a chronological change of the value of the variable. In addition, the collected data may store only the value of one variable, or may store the values of a plurality of variables. In another example, the collected data may store values calculated based on the values of a plurality of variables.

In addition, for example, the data storage 100 stores an application for analyzing the operation of the controller 20 or the controlled device 30. For example, this application uses the collected data as input, and outputs the analysis result. A relationship between the collected data and the analysis result is defined in the application. The analysis result includes the contents of the control command. For example, the analysis result includes the name of a variable having a value to be changed by the control command and the value. The application can also be expressed as a program for determining a type of a variable having a value to be changed and the value.

The data stored in the data storage 100 is not limited to the above-mentioned example. For example, the data storage 100 may store data indicating a variable to be collected for the collected data among the variables defined in the variable definition. The variables to be collected are specified by the user of the analysis device 10. The analysis device 10 collects the variables to be collected from the controller 20, and records the variables in the data storage 100 as collected data.

[Analysis Module]

The analysis module 101 is mainly implemented by the CPU 11. The analysis module 101 is configured to analyze the operation of at least one of the controller 20 or the controlled device 30. The analysis module 101 may analyze the operations of both the controller 20 and the controlled device 30, or may analyze the operation of any one of the controller 20 and the controlled device 30.

The analysis of the operation refers to "analyzing the collected data." The analysis module 101 performs the analysis by determining whether or not the collected data satisfies a predetermined condition. The predetermined condition is a condition that can be determined based on the collected data, and is, for example, whether or not a value indicated by the collected data is equal to or larger than a threshold value, or whether or not a value calculated based on the collected data is equal to or larger than a threshold value. For example, determining whether or not an abnormality has occurred in the operation corresponds to the analysis. Further, for example, determining whether or not it is required to change the value of the variable, a parameter, or firmware although no abnormality has occurred in the operation, corresponds to the analysis.

In this embodiment, the analysis is performed by the application, and hence the analysis module 101 inputs the variables presented in the collected data to the application, and uses the application to analyze the operation. For example, the analysis module 101 uses the application to acquire the contents of the control command. The contents of the control command include the name of the variable to be rewritten by the control command and its value. The contents of the control command may include other contents, for example, a command to be executed by the controller 20 or the controlled device 30, parameters to be changed and their values, or firmware to be changed.

[Determination Module]

The determination module 102 is mainly implemented by the CPU 11. The determination module 102 is configured to determine whether or not an input condition of the control command is satisfied based on the operation of at least one of the controller 20 or the controlled device 30. The determination module 102 may determine whether or not the input condition is satisfied based on the operations of both the controller 20 and the controlled device 30, or may be determine whether or not the input condition is satisfied based on the operation of any one of the controller 20 and the controlled device 30.

The input condition is a condition for determining whether or not to input the control command. In this embodiment, a case in which the input condition is a condition that can be determined based on the collected data is described, but the input condition may be any condition. For example, the input condition may be a condition irrelevant to the collected data, and may be a condition of, for example, a signal of a sensor directly connected to the analysis device 10, a state of a subject (for example, a workpiece) presented in an image acquired by a camera (vision sensor), or a current date/time.

For example, the determination module 102 determines whether or not the input condition is satisfied based on the collected data. The determination module 102 determines whether or not the value of the variable included in the collected data is within a predetermined range. The value of the variable being equal to or larger than a threshold value or the value of the variable being smaller than the threshold value corresponds to the value being within a predetermined range. For example, the determination module 102 determines whether or not the number of times that the value of the variable included in the collected data is within the predetermined range is equal to or larger than a predetermined number of times. Further, for example, the determination module 102 may determine whether or not the value calculated based on the collected data is equal to or larger than a threshold value, or whether or not the number of times that the value is equal to or larger than a threshold value is equal to or larger than a predetermined number of times.

[Input Module]

The input module 103 is mainly implemented by the CPU 11. The input module 103 is configured to input, to the controller 20, the control command relating to the operation of at least one of the controller 20 or the controlled device 30. The control command may be a command relating to the operation of both the controller 20 and the controlled device 30, or may be a command relating to the operation of any one of the controller 20 and the controlled device 30. The input as used herein has the same meaning as that of the transmission.

In this embodiment, the operation of at least one of the controller 20 or the controlled device 30 can be identified by the collected data collected from the controller 20, and hence the input module 103 inputs the control command corresponding to the collected data. When the operation can be identified by data other than the collected data, the input module 103 inputs the control command corresponding to the other data. The other data may be any data. For example, the other data may be physical quantity data (instantaneous value data) detected by a sensor such as a torque sensor or a motor encoder, or trace data storing those physical quantities in time series.

The input module 103 transmits, to the controller 20, the control command having the contents determined based on the collected data. In this embodiment, the contents of the control command are determined by an application for analysis, and hence the input module 103 transmits, to the controller 20, the control command indicating the contents output by the analysis module 101. For example, the type of the variable to be rewritten by the control command and its value are determined based on the contents of the collected data. The type and the value may be determined by, for example, the input module 103 or the analysis module 101.

In this embodiment, the input module 103 inputs a control command to the controller 20 when it is determined that the input condition is satisfied. When it is not determined that the input condition is satisfied, the control command is not input. In other words, the input module 103 inputs the control command to the controller 20 in response to the determination that the input condition is satisfied. The input module 103 waits to input the control command until the input condition is satisfied.

In this embodiment, the input module 103 inputs the control command based on the analysis result of the analysis module 101. For example, the input module 103 determines whether or not to transmit the control command based on the analysis result of the analysis module 101. The input module 103 transmits the control command when the analysis result is a predetermined result. In this case, the contents of the control command may be determined based on the collected data, or may be a fixed value irrespective of the collected data. Further, for example, the input module 103 inputs the control command having the contents corresponding to the analysis result of the analysis module 101. In this case, the name of the variable and its value that are included in the control command are determined by the analysis result.

[Transmission Module]

The transmission module 104 is mainly implemented by the CPU 11. The transmission module 104 is configured to transmit a predetermined completion notification to the controller 20 when the input of the control command is completed. When the input of the control command is not completed, the completion notification is not to be transmitted. The transmission module 104 transmits the completion notification to the controller 20 in response to the completion of the input of the control command.

The completion of the input of the control command occurs at a time point at which the analysis device 10 completes transmitting the control command, a time point at which the controller 20 completes receiving the control command, a time point at which the value of the variable included in the control command is written to the third storage 22B, or a time point after those time points.

The completion notification is a notification indicating that the input of the control command is completed. It suffices that the completion notification is data having a predetermined format, and the completion notification includes identification information indicating that the data is a completion notification. For example, the transmission module 104 determines whether or not the input has been performed up to the last data section of the control command. The transmission module 104 transmits the completion notification when the transmission module 104 determines that the input has been performed up to the last data section. The transmission module 104 waits to transmit the completion notification until the input has been completed up to the last data section.

3-2. Functions to be Implemented by Controller

As illustrated in FIG. 3, in the controller 20, a first data storage 200, a second data storage 201, a third data storage 202, a fourth data storage 203, a rewriting module 204, a determination module 205, and an operation control module 206 are implemented.

[First Data Storage]

The first data storage 200 is mainly implemented by the first storage 21A of the CPU 21. The first data storage 200 is configured to store data required for controlling the controlled device 30. For example, the first data storage 200 stores variable definition data D1 indicating the variable definition and variable value data D2 indicating each of the plurality of variables.

Figure 4:
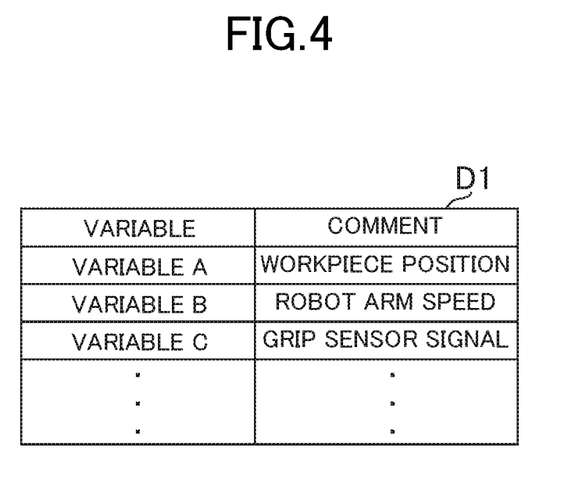
FIG. 4 is a table for showing a data storage example of variable definition data.

FIG. 4 is a table for showing a data storage example of variable definition data. As shown in FIG. 4, the variable definition data D1 includes information for identifying a rewritable variable. For example, the variable definition data D1 stores the name of the rewritable variable and a comment of the variable. The name of the variable is an example of the information for identifying the variable, and the variable may be identified not only by the name but also by an ID or other information.

The comment is any character string input by the user of the controller 20, and presents information including the content and usage indicated by the variable. The variable definition data D1 is not limited to the example of FIG. 4, and may be configured to store a list of all variables and a flag indicating whether or not each variable can be rewritten. In this case, the value of the flag is specified by the user of the controller 20.

Figure 5:
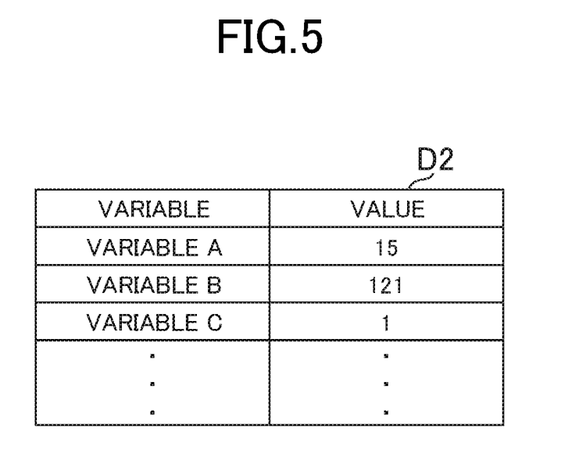
FIG. 5 is a table for showing a data storage example of variable value data.

FIG. 5 is a table for showing a data storage example of variable value data. As shown in FIG. 5, the variable value data D2 is data indicating a current value of each variable. For example, the variable value data D2 presents the current value of each variable. Each variable is stored in a specific register. It is assumed that a relationship between each variable and each register (which variable is stored in which register) is specified in advance by, for example, a creator of the control program. The variables stored in the registers can be referred to as appropriate by another device (for example, the controller 20).

[Second Data Storage]

The second data storage 201 is mainly implemented by the second storage 22A. The second data storage 201 is configured to store each of the plurality of variables. The second data storage 201 stores the same data as the variable value data D2. The second data storage 201 is regularly subjected to the matching with respect to the first data storage 200.

The matching is to cause any one of the value stored in the first data storage 200 and the value stored in the second data storage 201 to agree with the other (to copy one value to the other). For example, changing the value stored in the first data storage 200 to the value stored in the second data storage 201 for a variable having a given variable name corresponds to the matching. In regard to the variable to be rewritten, the value stored in the first data storage 200 is changed to the value stored in the second data storage 201.

Further, for example, changing the value stored in the second data storage 201 to the value stored in the first data storage 200 for a variable having a given variable name corresponds to the matching. When the variable collected by the analysis device 10 is recorded in the second data storage 201, the value stored in the second data storage 201 is changed to the value stored in the first data storage 200. Thus, the variables stored in the first data storage 200 are transmitted to the analysis device 10 via the second data storage 201.

The term "regularly" has the same meaning as "periodically." For each cycle period, the variables stored in the first data storage 200 and the variables stored in the second data storage 201 are matched with each other. The matching may be executed mainly by the CPU 21 or may be executed mainly by the IoT unit 22. The CPU 21 or the IoT unit 22 matches the variables stored in the first data storage 200 and the variables stored in the second data storage 201 for each cycle period with each other.

For example, the variable defined in the variable definition can be a target of the rewriting, and hence the variable stored in the second data storage 201 is copied to the first data storage 200. Consequently, the variable value data D2 of the first data storage 200 is replaced (overwritten) by the latest variable value data D2 of the second data storage 201. Only a part of the contents of the variable value data D2 stored in the second data storage 201 may be copied. For example, only the value of the variable to be rewritten may be copied.

[Third Data Storage]

The third data storage 202 is mainly implemented by the third storage 22B. The third data storage 202 is configured to store at least one variable corresponding to the control command. The third data storage 202 stores the value of the variable included in the control command. When the control command includes only the value of one variable, the third data storage 202 stores only the value of one variable. When the control command includes the values of a plurality of variables, the third data storage 202 stores only the values of the plurality of variables.

In this embodiment, the controller 20 receives the control command via the first communicator 22C, and hence the third data storage 202 stores the variable included in the control command received via the first communicator 22C. The variable stored in the third data storage 202 is written to the second data storage 201, and hence the third data storage 202 temporarily stores the variable included in the control command. The variable stored in the third data storage 202 may be deleted when the variable is written to the second data storage 201, or may be held until the next control command is input.

[Fourth Data Storage]

The fourth data storage 203 is mainly implemented by the fourth storage 23. The fourth data storage 203 is configured to store the data required for controlling the controlled device 30. For example, the fourth data storage 203 stores the control program and parameters. Further, for example, the fourth data storage 203 may store firmware or another program, or may store a program for transmitting the collected data to the analysis device 10.

The data stored in the controller 20 is not limited to the above-mentioned example. For example, the controller 20 may store register definition data for defining a register corresponding to each variable. Further, for example, the controller 20 may store information enabling identification of the controlled device 30 to be controlled by the controller 20 itself. Further, for example, the controller 20 may store information enabling identification of the analysis device 10. Those pieces of data may be stored in any one of the first data storage 200, the second data storage 201, the third data storage 202, and the fourth data storage 203.

[Rewriting Module]

The rewriting module 204 is mainly implemented by the IoT unit 22. That is, the IoT unit 22 includes the rewriting module 204. The rewriting module 204 is configured to rewrite at least one variable defined as a rewritable variable among the plurality of variables based on the control command. In this embodiment, the control command is input by the analysis device 10 being an external device, and hence the rewriting module 204 rewrites at least one variable based on the control command input from the analysis device 10.

The rewriting module 204 rewrites the value of the variable having the name included in the control command into the value included in the control command. The variable that is not defined in the variable definition is not subjected to the rewriting. The "rewriting" has the same meaning as overwriting, updating, or transferring. Changing the value stored in the memory to the value included in the control command corresponds to the rewriting.

When the control command includes a variable that is not defined in the variable definition (a variable that is not rewritable), the rewriting module 204 may restrict the rewriting of the value of the variable. In this case, the rewriting module 204 refers to the variable definition data D1 to determine whether or not the variable included in the control command is a rewritable variable. When the rewriting module 204 determines that the variable included in the control command is a rewritable variable, the rewriting module 204 rewrites the value of the variable. When the rewriting module 204 does not determine that the variable included in the control command is a rewritable variable, the rewriting module 204 does not rewrite the value of the variable.

In this embodiment, the rewriting module 204 writes at least one variable stored in the third data storage 202 to the second data storage 201, and writes the at least one variable written in the second data storage 201 to the first data storage 200. The rewriting module 204 writes the at least one variable stored in the third data storage 202 to the first data storage 200 via (through intermediation of) the second data storage 201.

For example, the rewriting module 204 determines whether or not the writing of at least one variable to the third data storage 202 in accordance with the control command is completed. The rewriting module 204 determines whether or not all of at least one variable corresponding to the control command have been written to the third data storage 202. For example, when the rewriting module 204 receives the completion notification, the rewriting module 204 determines that the writing of at least one variable corresponding to the control command to the third data storage 202 is completed.

When the rewriting module 204 determines that the writing to the third data storage 202 is completed, the rewriting module 204 starts to write at least one variable written in the third data storage 202 to the second data storage 201. When the rewriting module 204 does not determine that the writing to the third data storage 202 is completed, the rewriting module 204 does not start the writing. The rewriting module 204 starts to write in response to the determination that the writing to the third data storage 202 is completed. That is, the rewriting module 204 waits to perform the writing until the rewriting module 204 determines that the writing to the third data storage 202 is completed. When it is determined that the matching between the first data storage 200 and the second data storage 201 has been performed, the rewriting module 204 writes the variable written in the third data storage 202 to the second data storage 201. When it is not determined that the matching has been performed, the rewriting module 204 does not start the writing. The rewriting module 204 starts the writing in response to the determination that the matching has been performed. That is, the rewriting module 204 waits to perform the writing until it is determined that the matching has been performed.

[Determination Module]

The determination module 205 is mainly implemented by the IoT unit 22. The determination module 205 is configured to determine whether or not the matching has been performed between the first data storage 200 and the second data storage 201. In this embodiment, the matching is periodically performed between the first data storage 200 and the second data storage 201, and the matching is completed immediately before one cycle period ends. Accordingly, the determination module 205 determines whether or not a time point immediately before one cycle period ends has arrived. It suffices that this time point is a time point a predetermined time before an end time point of one cycle period (a time point a predetermined time period after a start time point of one cycle period).

For example, assuming that one cycle period is T microseconds (where T is a positive number), the determination module 205 may determine whether or not the time point T/10 microseconds before the end time point of one cycle period has arrived. It suffices that a period from this time point until the end time point of one cycle period is set to have such a length enough to enable processing for writing the value of the variable stored in the third data storage 202 to the second data storage 201 to be sufficiently completed. When this time point has arrived, the determination module 205 determines that the matching has been performed between the first data storage 200 and the second data storage 201.

The determination method performed by the determination module 205 is not limited to the above-mentioned example. For example, when the matching of a plurality of variables is performed in order, the determination module 205 may determine whether or not the matching has been completed up to the last variable. Further, for example, when a predetermined notification is transmitted from the CPU 21 to the IoT unit 22 at a time of completion of the matching of the variables, the determination module 205 may determine whether or not this notification has been received.

[Operation Control Module]

The operation control module 206 is mainly implemented by the CPU 21. The operation control module 206 is configured to periodically update each of the plurality of variables to control the controlled device 30. The operation control module 206 controls the operation of the controlled device 30 based on the control program. For example, the operation control module 206 sends an instruction to the controlled device 30, and the controlled device 30 operates based on the instruction. In this embodiment, the controlled device 30 operates based on the value of the variable associated with the device program, and hence, for example, the operation control module 206 sends, to the controlled device 30, an instruction to change the value of the variable for starting the device program. The controlled device 30 executes the device program by changing the value of the variable based on the instruction. When the variable is not particularly used for controlling the operation of the controlled device 30, the operation control module 206 may control the operation of the controlled device 30 by transmitting a command indicating the operation to be executed by the controlled device 30.

3-3. Functions to be Implemented in Controlled Device

As illustrated in FIG. 3, in the controlled device 30, a data storage 300 and a process execution module 301 are implemented.

[Data Storage]

The data storage 300 is mainly implemented by the storage 32. The data storage 300 is configured to store the data required for the controlled device 30 to perform a predetermined operation. For example, the data storage 300 stores the device program and current values of the variables. The current values of the variables are the same as the values stored in the variable value data D2. The data storage 300 also stores the values of variables other than variables defined in the variable definition. The value of each variable is stored in a register determined in advance.

[Process Execution Module]

The process execution module 301 is mainly implemented by the CPU 31. The process execution module 301 is configured to execute a predetermined process based on the device program stored in the data storage 300 and an instruction received from the controller 20. For example, when the controller 20 is to start a certain device program, the controller 20 transmits to the controlled device 30 an instruction to set a variable associated with the device program to a predetermined value. When the controlled device 30 receives the instruction, the controlled device 30 changes the variable to a predetermined value. When the process execution module 301 detects that the variable has been changed to the predetermined value, the process execution module 301 executes the device program associated with the variable.

When the process indicated by the device program ends, the process execution module 301 changes the variable associated with the device program to a predetermined value, and transmits the fact to the controller 20. Then, when executing another device program, the controller 20 transmits to the controlled device 30 an instruction to set the variable associated with the another device program to a predetermined value, and the process execution module 301 executes the another device program. When the execution order of a plurality of device programs is defined in the controlled device 30, it is not required to transmit the end of the device program to the controller 20, and the process execution module 301 may execute the plurality of device programs one after another.

4. Processing to be Executed in Production System

Figure 6:
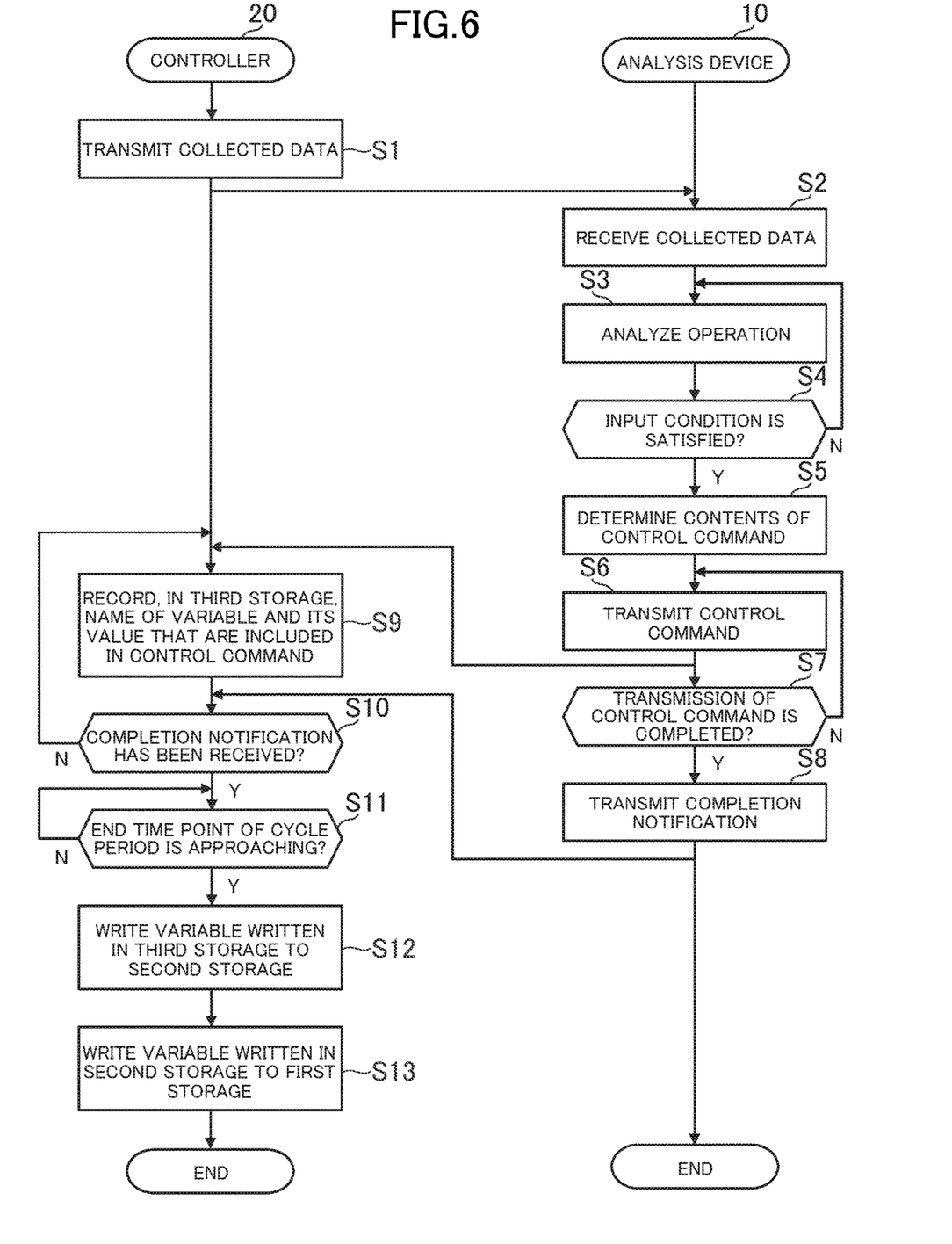
FIG. 6 is a flowchart for illustrating an example of processing to be executed in the production system.

FIG. 6 is a flowchart for illustrating an example of processing to be executed in the production system 1. The processing illustrated in FIG. 6 is an example of the processing to be executed by the functional blocks illustrated in FIG. 3. In FIG. 6, description is mainly given of processing relating to the control command, and processing to be performed by the controller 20 to control the controlled device 30 is omitted.

As illustrated in FIG. 6, the controller 20 transmits the collected data to the analysis device 10 (Step S1). In Step S1, the controller 20 identifies variables to be collected based on the variable definition data D1 stored in the first storage 21A. The controller 20 refers to the variable value data D2 stored in the first storage 21A to generate collected data indicating the values of the variables to be collected. The controller 20 transmits the generated collected data to the analysis device 10.

The analysis device 10 receives the collected data from the controller 20 (Step S2). In Step S2, the analysis device 10 records the received collected data in the storage 12. The collected data is referred to by the application for analysis. The application for analysis may be activated by an operation of the user of the analysis device 10, or may stay activated at all times. The collected data may be referred to by the application at any timing.

The analysis device 10 analyzes the operation of the controller 20 or the controlled device 30 based on the application for analysis (Step S3). In Step S3, the analysis device 10 inputs the collected data to the application to execute the application. The application outputs the analysis result.

The analysis device 10 determines whether or not the input condition of the control command is satisfied based on the analysis result obtained in Step S3 (Step S4). In Step S4, the analysis device 10 determines whether or not the analysis result indicating that the value of the variable is equal to or larger than the threshold value has been obtained.

When it is not determined that the input condition is satisfied (N in Step S4), the processing returns to Step S3. In this case, the input condition is not satisfied, and hence the control command is not transmitted. Meanwhile, when it is determined that the input condition is satisfied (Y in Step S4), the analysis device 10 determines the contents of the control command based on the analysis result (Step S5). In Step S5, the analysis device 10 acquires the type of variable and its value that were determined by the application, and determines the type and the value as the contents of the control command.

The analysis device 10 transmits the control command to the controller 20 (Step S6). In Step S6, the analysis device 10 generates and transmits a control command including the name of the variable and its value that were determined in Step S5. The analysis device 10 determines whether or not the transmission of the control command is completed (Step S7). In Step S7, the analysis device 10 determines whether or not the transmission has been completed up to the last data section (last packet) in the control command.

When it is not determined that the transmission of the control command is completed (N in Step S7), the processing returns to Step S6 to continue transmitting the control command. Meanwhile, when it is determined that the transmission of the control command is completed (Y in Step S7), the analysis device 10 transmits a predetermined completion notification to the controller 20 (Step S8).

The controller 20 receives the control command via the first communicator 22C, and records, in the third storage 22B, the name of the variable and its value that are included in the control command (Step S9). In Step S9, each time the controller 20 receives a packet of the control command, the controller 20 records, in the third storage 22B, the name of the variable and its value that are included in the packet.

The controller 20 determines whether or not the completion notification has been received (Step S10). When it is not determined that the completion notification has been received (N in Step S10), the processing returns to Step S9 to continue receiving the control command. Meanwhile, when it is determined that the completion notification has been received (Y in Step S10), the controller 20 determines whether or not the end time point of the cycle period for performing the matching of the variables between the first storage 21A and the second storage 22A is approaching (Step S11). For example, the controller 20 manages the time based on a timer value, and refers to the timer value to determine whether or not a time point a predetermined time before the end time point within one cycle period has arrived.

When it is not determined that the end time point of the cycle period is approaching (N in Step S11), the processing of Step S11 is executed again. In this case, even when the completion notification is received, the variable included in the control command is not to be written to the second storage 22A. Meanwhile, when it is determined that the end time point of the cycle period is approaching (Y in Step S11), the controller 20 writes the variable written in the third storage 22B to the second storage 22A (Step S12). The controller 20 waits to execute the processing of Step S12 until the determination performed in Step S11 becomes affirmative.

When the next cycle period arrives, the controller 20 writes the variable written in the second storage 22A to the first storage 21A (Step S13), and this processing ends. The controller 20 controls the controlled device 30 based on the variable written in Step S13.

With the production system 1 described above, at least one variable defined as a rewritable variable is rewritten based on the control command relating to the operation of at least one of the controller 20 or the controlled device 30. Thus, the contents of the control command can be quickly reflected in the value of the variable, and the control command directed to the controller 20 can be quickly executed. In addition, the rewritable variable is defined in advance by the control command, to thereby be able to prevent unintended rewriting of the variable and to accurately execute the control command directed to the controller 20. The quick and accurate execution of the control command can improve accuracy of the operation of the controlled device 30.

In the production system 1, the control command is input when the input condition is satisfied, that is, the control command is not regularly input (the control command is not always input). Consequently, a processing load on the controller 20 can be reduced.

In the production system 1, the CPU 21 being the first control circuit for controlling the controlled device 30 and the IoT unit 22 being the second control circuit for communicating to/from the outside are physically separated from each other, and hence it is possible to distribute the processing load and to prevent occurrences of problems in controlling the controlled device 30 and executing control commands. As a result, it is possible to improve the accuracy of control and to execute the control command directed to the controller 20 more quickly and accurately.

In the production system 1, at least one variable stored in the third storage 22B is written to the second storage 22A, and the at least one variable written in the second storage 22A is written to the first storage 21A, to thereby be able to accurately reflect at least one variable corresponding to the control command in the controller 20.

When it is determined that the writing of at least one variable included in the control command to the third storage 22B is completed, the production system 1 starts to write the at least one variable written in the third storage 22B to the second storage 22A, to thereby be able to prevent the writing to the second storage 22A from being started before the writing of at least one variable included in the control command is completed and to execute the control command more accurately.

In the production system 1, when the controller 20 receives the completion notification, it is determined that the writing of at least one variable corresponding to the control command to the third storage 22B is completed, to thereby be able to accurately determine the completion of the writing and to execute the control command more accurately. In addition, the controller 20 can identify the completion of the writing by receiving the completion notification, and hence it is not required to constantly determine whether or not the writing is completed, to thereby be able to reduce the processing load on the controller 20.

The production system 1 writes the variable written in the third storage 22B to the second storage 22A when it is determined that the matching has been performed between the first storage 21A and the second storage 22A, to thereby be able to execute the control command more accurately.

The production system 1 can execute the control command corresponding to the analysis result quickly and accurately by inputting the control command based on the analysis result of the operation.

The production system 1 can quickly and accurately execute the control command sent from the analysis device 10 being an external device. When roles are divided between the analysis device 10 and the controller 20, the controller 20 is no longer required to determine, for example, whether or not the control command is required to be transmitted, to thereby be able to reduce the processing load on the controller 20.

5. Modification Examples

The present disclosure is not limited to the embodiment described above, and can be modified suitably without departing from the spirit of the present disclosure.

(1) For example, when the analysis device 10 stores a plurality of applications and the analysis module 101 performs an analysis based on each of the plurality of applications, variables to be rewritten are defined for the applications. In the applications, analyses are performed from mutually different perspectives. The types of the variables to be referred to by the applications may differ from each other. For example, in an application for analyzing a torque, the variable indicating the torque is referred to. Meanwhile, for example, in an application for analyzing a speed of a motor, the variable indicating a rotation speed and a rotation angle are referred to. The same applies to the other applications, and the variables required for analyses are referred to.

A variable is associated with each application. The variable associated with each application is a variable to be rewritten by the control command. It is assumed that the association between the application and the variable is stored in the data storage 100. This association may have any data format. For example, the association may be defined by data having a mathematical expression format or a table format, or may be defined as a code for the application for analysis or another program.

The input module 103 inputs a control command including at least one variable associated with each application based on an execution result of the application. In Modification Example (1) of the present disclosure, an input condition is defined for each application, and the input module 103 identifies the variable associated with the application satisfying the input condition. The input module 103 generates a control command including the name of the identified variable and its value, and inputs the control command to the controller 20. When the input conditions of the plurality of applications are satisfied, the input module 103 may input the control commands corresponding to the plurality of applications, respectively. In this case, as in Modification Example (2) of the present disclosure described later, the simultaneous input of the plurality of control commands may be restricted, or the plurality of control commands may be simultaneously input without particularly imposing the restrictions on the plurality of control commands.

The rewriting module 204 rewrites at least one variable associated with each application based on the control command of the application. The processing for rewriting the variable itself is as described in the embodiment. It suffices that the rewriting module 204 rewrites the value of the variable having the name included in the received control command.

According to Modification Example (1), the variable corresponding to the application is rewritten, to thereby be able to execute the control command corresponding to the application more quickly and accurately. As a result, the accuracy of the operation of the controlled device 30 can be improved more effectively.

(2) Further, for example, in Modification Example (1), when a plurality of applications attempt to simultaneously send control commands, there may be a variable that is not to be reflected accurately. For example, there may be a case in which a control command of one application X includes a value of a variable A while a control command of another application Y includes a value of the same variable A. In this case, when those control commands are simultaneously transmitted to the controller 20, the controller 20 cannot identify which value is to be rewritten. In addition, when the rewriting into the value of any one of the applications X and Y is performed, the rewriting based on the other may not be performed accurately. Accordingly, control commands of a plurality of applications may be prevented from being simultaneously input.

Figure 7:
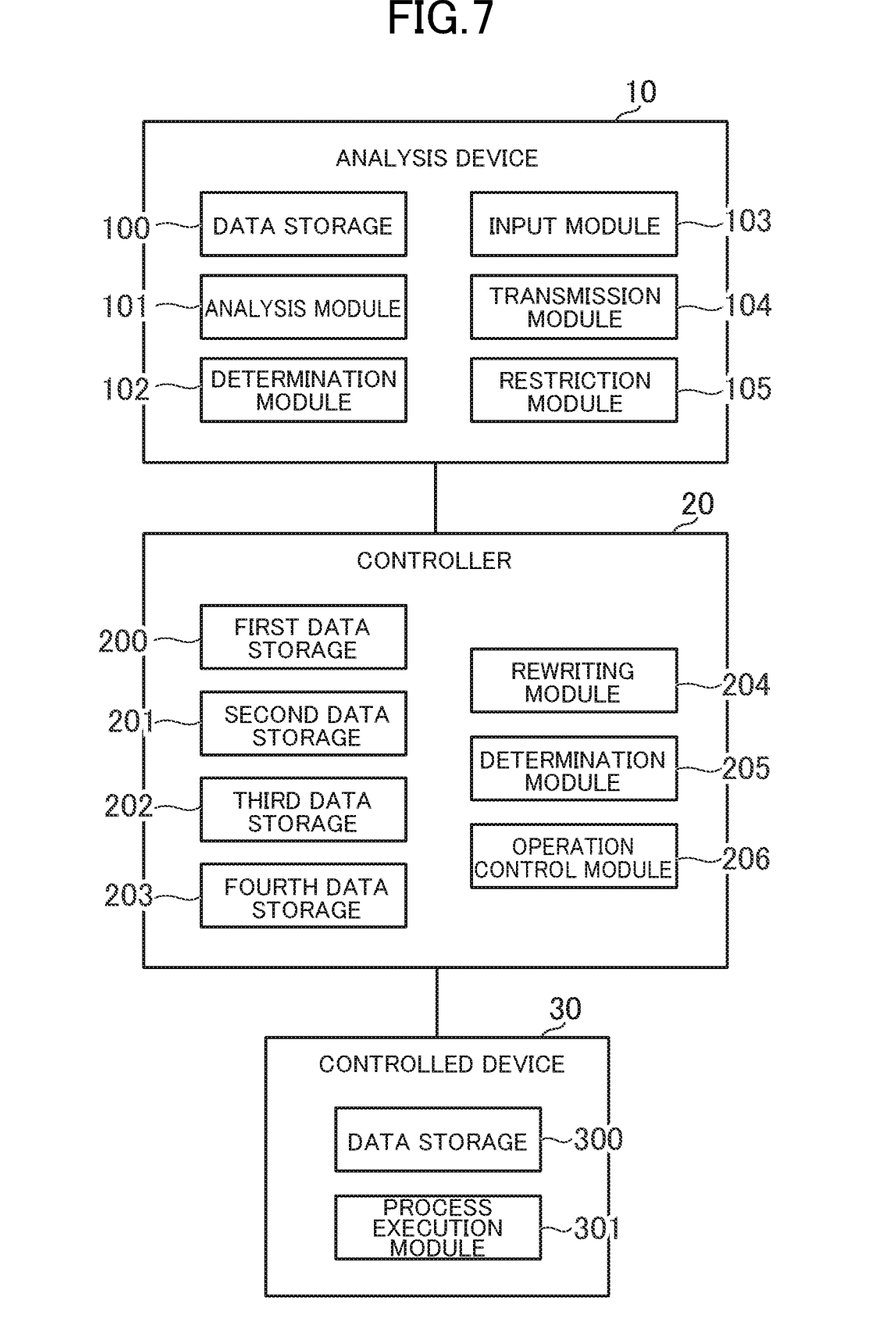
FIG. 7 is a functional block diagram in Modification Example (2) of the present disclosure.

FIG. 7 is a functional block diagram in Modification Example (2). As illustrated in FIG. 7, in Modification Example (2), a restriction module 105 is implemented by the analysis device 10. The restriction module 105 is mainly implemented by the CPU 11. The restriction module 105 is configured to restrict the simultaneous input of control commands of a plurality of applications.

The restriction is to inhibit the control commands of a plurality of applications from being simultaneously input to the controller 20. For example, when there are a plurality of applications satisfying the input conditions, the restriction module 105 causes the input module 103 to input the control commands one by one. An order of the control commands may be randomly determined, or may be determined based on priorities assigned in advance to the applications.

The restriction module 105 determines the order of inputting the control commands, and causes the input module 103 to input the control commands in the determined order. For example, when the input of the control command of a given application is completed, the restriction module 105 starts to input the control command of the next application. A restriction method performed by the restriction module 105 is not limited to the above-mentioned example. For example, when there are a plurality of applications satisfying the input conditions, the restriction module 105 may cause the input module 103 to input only the control command of any one of the applications. In this case, only the control command of the application having the highest priority may be input.

According to Modification Example (2), it is possible to execute the control commands more accurately by restricting the simultaneous input of the control commands of a plurality of applications.

(3) Further, for example, the above-mentioned modification examples may be combined.

Further, for example, the input condition of the control command may not particularly be set, and the control command may be input to the controller 20 regularly or constantly. Further, for example, the controller 20 is not required to have the roles divided between the CPU 21 and the IoT unit 22. The CPU 21 may also implement the functions of the IoT unit 22. Further, for example, the controller 20 is not required to include separate components of the first storage 21A, the second storage 22A, the third storage 22B, and the fourth storage 23, and the rewriting of a variable may be completed in one storage. In this case, the memory is not physically divided, and hence the variable included in the control command is written to each of a plurality of data areas set in one memory. The value of the variable is rewritten between the data areas.

Further, for example, the variables may not be regularly matched with each other between the first storage 21A and the second storage 22A. In this case, the variable written in the second storage 22A may be written to the first storage 21A only when the control command is received. Further, for example, the control command may be input based on trace data or other data in place of the analysis result of the collected data. Further, for example, the case in which the users of the devices included in the production system 1 are different has been described, but the users may be the same. Further, for example, the writing of the variable from the second storage 22A to the third storage 22B is not limited to immediately before the end of one cycle period. For example, as long as the variable allows a deviation of about one cycle period to several cycle periods, the variable may be written from the second storage 22A to the third storage 22B at any timing.

Further, for example, each of the functions described above may be implemented by any device included in the production system 1. For example, the function described as being implemented by the analysis device 10 may be implemented by the controller 20 or the controlled device 30. Further, for example, the function described as being implemented by the controller 20 may be implemented by the analysis device 10 or the controlled device 30. Further, for example, each of the functions may be implemented by one computer instead of being shared by a plurality of computers.

Further, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications.

What is claimed is:

1. A production system, comprising:
    a first industrial machine configured to control a second industrial machine based on each of a plurality of variables; and
    circuitry configured to input, to the first industrial machine, a control command relating to an operation of at least one of the first industrial machine or the second industrial machine,
    wherein the first industrial machine rewrites, based on the control command, at least one variable defined as a rewritable variable among the plurality of variables,
    wherein the first industrial machine includes:
        a first control circuit configured to control the second industrial machine based on each of the plurality of variables; and
        a second control circuit configured to receive the control command, and
    wherein the second control circuit rewrites the at least one variable,
    wherein the first control circuit includes a first memory configured to store each of the plurality of variables,
    wherein the second control circuit includes:
        a second memory configured to store each of the plurality of variables to have each of the plurality of variables regularly subjected to matching with respect to the first memory; and
        a third memory configured to store the at least one variable corresponding to the control command,
    wherein the second control circuit is configured to:
        write the at least one variable stored in the third memory to the second memory; and
        write the at least one variable written in the second memory to the first memory.

2. The production system according to claim 1,
    wherein the first industrial machine is configured to periodically update each of the plurality of variables to control the second industrial machine,
    wherein the production system determines whether an input condition of the control command is satisfied based on the operation of at least one of the first industrial machine or the second industrial machine, and
    wherein the circuitry is configured to input the control command to the first industrial machine when it is determined that the input condition is satisfied.

3. The production system according to claim 2,
    wherein the production system is configured to analyze the operation of at least one of the first industrial machine or the second industrial machine, and
    wherein the circuitry is configured to input the control command based on an analysis result of the operation.

4. The production system according to claim 1, wherein the second control circuit is configured to:
    determine whether the writing of the at least one variable corresponding to the control command to the third memory is completed; and
    start to write the at least one variable written in the third memory to the second memory when it is determined that the writing to the third memory is completed.

5. The production system according to claim 4,
    wherein the production system is configured to transmit a predetermined completion notification to the first industrial machine when the input of the control command is completed, and
    wherein the second control circuit is configured to determine, when the predetermined completion notification is received, that the writing of the at least one variable corresponding to the control command to the third memory is completed.

6. The production system according to claim 4,
wherein the production system is configured to analyze the operation of at least one of the first industrial machine or the second industrial machine, and
wherein the circuitry is configured to input the control command based on an analysis result of the operation.

7. The production system according to claim 5,
wherein the production system is configured to analyze the operation of at least one of the first industrial machine or the second industrial machine, and
wherein the circuitry is configured to input the control command based on an analysis result of the operation.

8. The production system according to claim 1,
wherein the production system is configured to determine whether the matching has been performed between the first memory and the second memory, and
wherein the second control circuit is configured to write the variable written in the third memory to the second memory when it is determined that the matching has been performed between the first memory and the second memory.

9. The production system according to claim 8,
wherein the production system is configured to analyze the operation of at least one of the first industrial machine or the second industrial machine, and
wherein the circuitry is configured to input the control command based on an analysis result of the operation.

10. The production system according to claim 1, further comprising an external device different from the first industrial machine,
wherein the external device includes the circuitry, and
wherein the first industrial machine is configured to rewrite the at least one variable based on the control command input from the external device.

11. A production system, comprising:
a first industrial machine configured to control a second industrial machine based on each of a plurality of variables; and
circuitry configured to input, to the first industrial machine, a control command relating to an operation of at least one of the first industrial machine or the second industrial machine,
wherein the first industrial machine rewrites, based on the control command, at least one variable defined as a rewritable variable among the plurality of variables,
wherein the production system is configured to analyze the operation of at least one of the first industrial machine or the second industrial machine, the operation being indicated in collected data that is a physical quantity detected by a sensor, and
wherein the circuitry is configured to input the control command based on an analysis result of the operation.

12. The production system according to claim 11,
wherein the production system is configured to perform an analysis based on each of a plurality of applications,
wherein the circuitry is configured to input, based on an execution result of each of the plurality of applications, a control command including at least one variable associated with the each of the plurality of applications, and
wherein the first industrial machine is configured to rewrite, based on the control command of each of the plurality of applications, the at least one variable associated with the each of the plurality of applications.

13. The production system according to claim 12, wherein the production system is configured to restrict simultaneous input of control commands of the plurality of applications.

14. A control method, comprising:
inputting, to a first industrial machine configured to control a second industrial machine based on each of a plurality of variables, a control command relating to an operation of at least one of the first industrial machine or the second industrial machine; and
rewriting, by the first industrial machine, based on the control command, at least one variable defined as a rewritable variable among the plurality of variables,
wherein the first industrial machine includes:
a first control circuit configured to control the second industrial machine based on each of the plurality of variables; and
a second control circuit configured to receive the control command, and
wherein the second control circuit rewrites the at least one variable,
wherein the first control circuit includes a first memory configured to store each of the plurality of variables,
wherein the second control circuit includes:
a second memory configured to store each of the plurality of variables to have each of the plurality of variables regularly subjected to matching with respect to the first memory; and
a third memory configured to store the at least one variable corresponding to the control command,
wherein the second control circuit is configured to:
write the at least one variable stored in the third memory to the second memory; and
write the at least one variable written in the second memory to the first memory.

15. A control method, comprising:
inputting, to a first industrial machine configured to control a second industrial machine based on each of a plurality of variables, a control command relating to an operation of at least one of the first industrial machine or the second industrial machine; and
rewriting, by the first industrial machine, based on the control command, at least one variable defined as a rewritable variable among the plurality of variables,
wherein the control method further comprises:
analyzing the operation of at least one of the first industrial machine or the second industrial machine, the operation being indicated in collected data that is a physical quantity detected by a sensor, and
inputting the control command based on an analysis result of the operation.

* * * * *